United States Patent [19]

Kim

[11] Patent Number: 4,972,112
[45] Date of Patent: Nov. 20, 1990

[54] BRUSHLESS DC MOTOR

[76] Inventor: Dae W. Kim, Yaksu Apt. 2 - 301 216-3, Sangdo-4-dong, Dongjak-Ku, Seoul, Rep. of Korea

[21] Appl. No.: 365,113

[22] Filed: Jun. 12, 1989

[51] Int. Cl.[5] ............ H02K 1/17; H02K 21/04; H02K 21/12; H02K 21/26
[52] U.S. Cl. ................... 310/181; 310/154; 310/156; 310/180
[58] Field of Search ............. 310/46, 154, 156, 177, 310/179, 180, 181, 185, 186, 190, 194

[56] References Cited

U.S. PATENT DOCUMENTS

| | | | |
|---|---|---|---|
| 3,201,625 | 8/1965 | Smith et al. | 310/190 |
| 3,670,189 | 6/1972 | Monroe | 310/181 |
| 3,862,445 | 1/1975 | Volkrodt | 310/181 |
| 3,999,107 | 12/1976 | Reuting | 310/154 |
| 4,007,387 | 2/1977 | Rustecki | 310/42 |
| 4,011,479 | 3/1977 | Volkrodt | 310/186 |
| 4,712,028 | 12/1987 | Horber | 310/154 |
| 4,763,034 | 8/1988 | Gamble | 310/156 |

FOREIGN PATENT DOCUMENTS

| | | | |
|---|---|---|---|
| 748701 | 6/1978 | U.S.S.R. | |
| 0630708 | 10/1978 | U.S.S.R. | 310/181 |

*Primary Examiner*—Steven L. Stephan
*Assistant Examiner*—Clayton E. LaBalle
*Attorney, Agent, or Firm*—Wenderoth, Lind & Ponack

[57] ABSTRACT

A brushless DC motor includes a rotor assembly and a stator assembly. The rotor assembly includes a plurality of rotor permanent magnets of a first polarity. The stator assembly includes a plurality of stator magnetic field assemblies facing the rotor assembly. Each stator magnetic field assembly includes a box-like magnetic core having an opening facing the rotor assembly. A permanent magnetic core is disposed within the box-like magnetic core having a surface facing the rotor assembly and possessing a second polarity at this surface. A field coil is wound in proximity to the box-like magnetic core for energizing the stator magnetic field assembly. A boosting permanent magnet is provided along an outer surface of the box-like magnetic core.

1 Claim, 5 Drawing Sheets

BRUSHLESS DC MOTOR

BACKGROUND OF THE INVENTION

1. Field of the Invention

The present invention relates to a brushless DC motor of the type in which a magnetic field of a rotor is generated by a rotor permanent magnet and a magnetic field of a stator is generated by a field magnetic coil. In particular, the present invention relates to a brushless DC motor in which the efficiency thereof is improved by providing a permanent magnetic core within a stator field magnetic coil core and by providing a boosting permanent magnet external this permanent magnetic core within the stator. The stator magnetic field is enhanced by the combination of the magnetic force of the field magnetic coil and the magnetic force of the boosting permanent magnet when the field magnetic coil is excited.

2. Description of the Related Art

In the conventional DC motor of the type in which the magnetic field of the rotor is generated by the rotor permanent magnet and the magnetic field of the stator is generated by the field magnetic coil, the efficiency is low relative the power consumption of the electric current supplied to excite the field magnetic coil to generate the magnetic field of the stator.

SUMMARY OF THE INVENTION

The present invention in conceived in due consideration of the low efficiency of the conventional DC motor. According to the present invention, even when a small amount of electric power is consumed, the efficiency of the motor is enhanced a considerable degree by the provision of a permanent magnetic core within the field magnetic coil core and a boosting permanent magnet external the permanent magnetic core to thereby enhance the strength of the stator magnetic field which is formed when the field magnet is excited utilizing the boosting permanent magnet.

DETAILED DESCRIPTION OF THE PREFERRED EMBODIMENT

Figure 1:
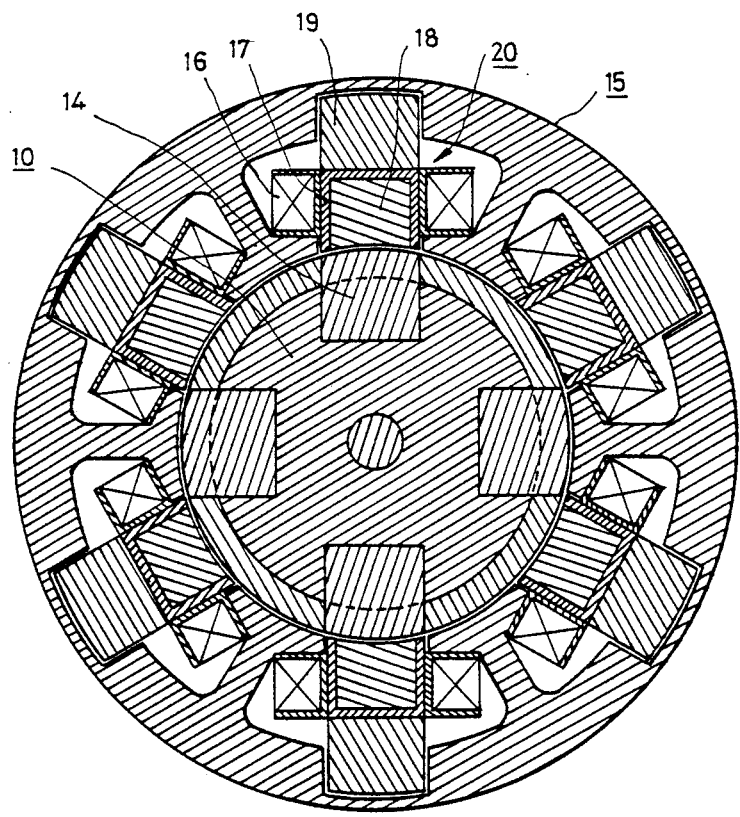
FIG. 1 is a vertical cross-sectional view of the present invention.
Figure 2:
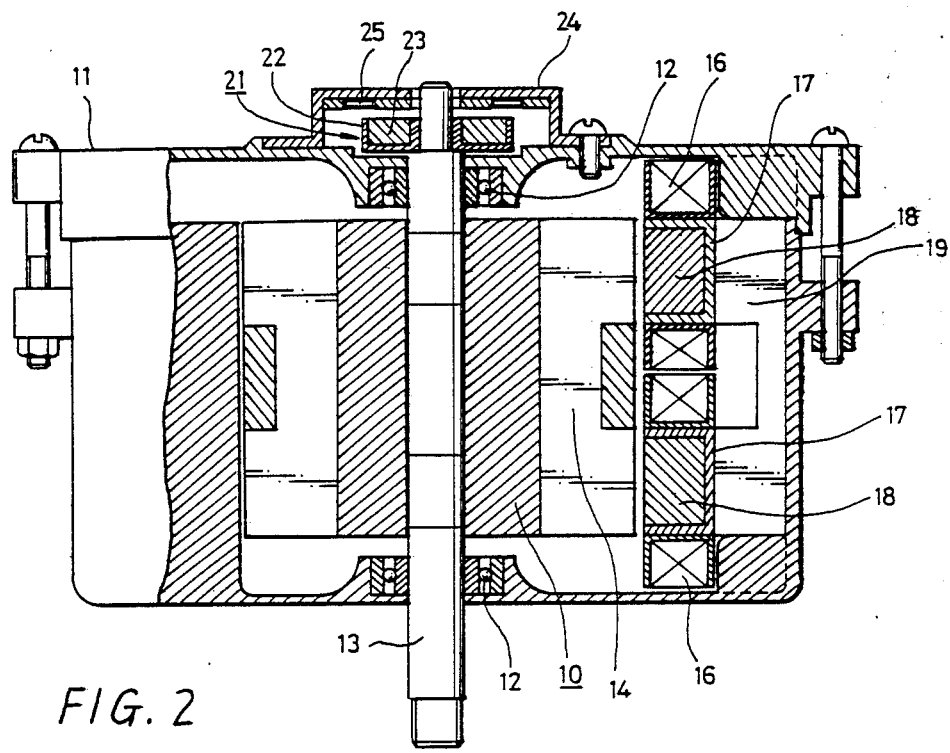
FIG. 2 is a cutaway plane cross-sectional view of the present invention.
Figure 3:
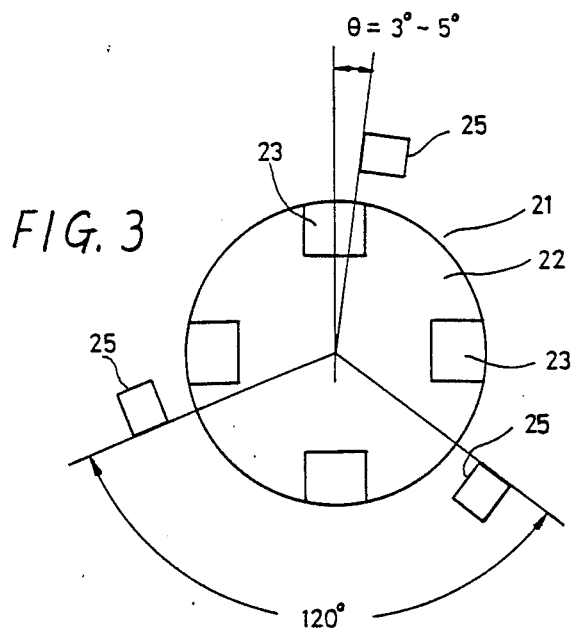
FIG. 3 is a diagram showing a position sensing rotor and the position of the position sensing elements.

FIG. 1 and FIG. 2 illustrated the configuration of the present invention. A rotor (10) is provided on a rotating shaft (13) and supported by ball bearings (12) contained within a casing (11). Permanent magnets (14) are placed with magnetic poles along the circumference of the rotor (10) and are arranged at a same spacing from each other, for example, at every 90° angle as illustrated. In the illustrated example, the number of rotor poles amounts to 4.

The stator (15) includes a plurality of stator magnetic field assemblies (20), each of which comprises a field coil (16) which forms the magnetic field of stator (15). The field coil (16) is wound onto a box-type core (17) having an open side facing the rotor (10). Within the core (17), a permanent magnetic core (18) is provided having a magnetic pole of a polarity contrary to that of rotor permanent magnet (14) facing toward the rotor permanent magnet (14). On the outside of box-type core (17) opposite the opening thereof, a boosting permanent magnet (19) is provided having a magnetic pole of a polarity identical to that of rotor permanent magnet (14) facing in the direction toward the rotor permanent magnet (14). Accordingly, a field magnetic coil (16), a permanent magnetic core (18) and a boosting permanent magnet (19) form the stator magnetic field assembly (20). The stator magnetic field assembly (20) will achieve a S-N-S magnetism arrangement by means of the boosting permanent magnet (19), if the magnetic pole polarity of rotor permanent magnet (14) is N, when the permanent magnetic core (18) polarity does not excite the field coil (16). The stator magnetic field formed by the stator field magnetic assembly (20) comprises 6 field poles.

The field coils (16) of the stator magnetic field assembly (20) are connected in series with those field coils (16) which are in the diametrical opposed direction and accordingly the mechanical angle between phases is 120°.

As shown in FIG. 2, a position sensing rotor (21) is installed at the end of rotating shaft (13) on one side of the casing (11). The position sensing rotor (21) comprises a yoke (22) and a position sensing permanent magnet (23) which is arranged in the yoke (22) in the same manner as the rotor permanent magnet (14). A position sensing element (25) is installed in the cap-type case (24). The position sensing element (25) is a Hall element and the position at which it is placed is coincident with the mechanical angle of the stator. Such a position sensing element (25) is well-known in the art as is the position sensing rotor (21). The position sensing element (25) is connected to a well-known drive circuit of the motor to supply an intermittent electric current to the field coil (16).

The operation of the present invention as configured in such a manner as described hereinabove is explained with reference to FIGS. 4A, 4B and 4C.

Figure 4A:
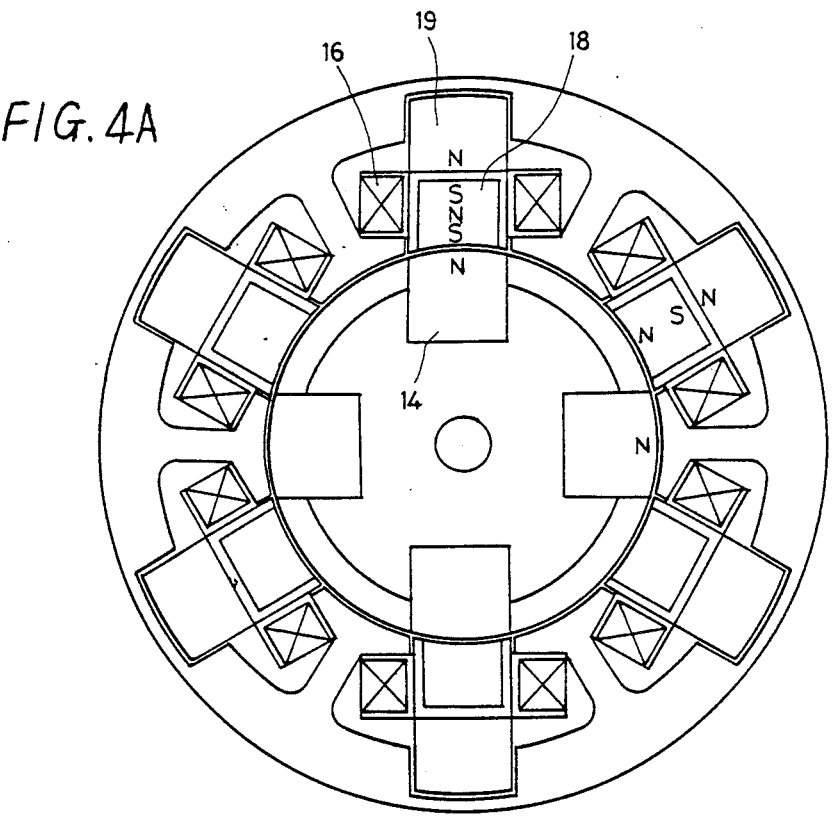
FIG. 4A, FIG. 4B and FIG. 4C are diagrams for explaining the operation of the present invention.

Suppose that the relative positions of the rotor (10) and stator (15) are as shown in FIG. 4A when the DC motor is not operated. If the polarity of rotor permanent magnet (14) is N at this time, the magnetism of the permanent magnetic core (18) of the stator field magnetic assembly (20) will be in an SNS arrangement. Accordingly, the polarity of stator field magnetic assembly (20) is S and, since the polarity of rotor permanent magnet (14) and the polarity of stator field magnetic assembly (2) are opposed, there exists an attracting force between the two. When an electric current is supplied to the drive circuit of the motor, the position sensing element (25) senses the position of rotor permanent magnet (14) by means of the permanent magnet (23) of the position sensing rotor (21). The two field magnetic coils (16) are then excited by supplying an electric current thereto, which are opposed in the drive circuit in the diametrical direction, of the stator field magnetic assembly (20).

Figure 4B:
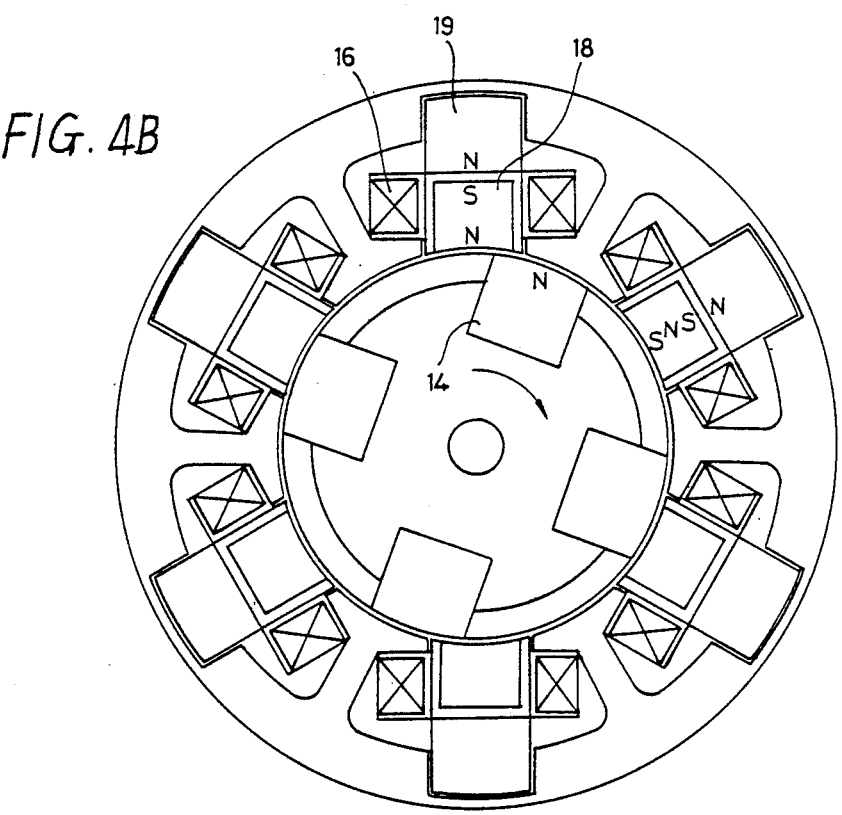
Figure 4C:
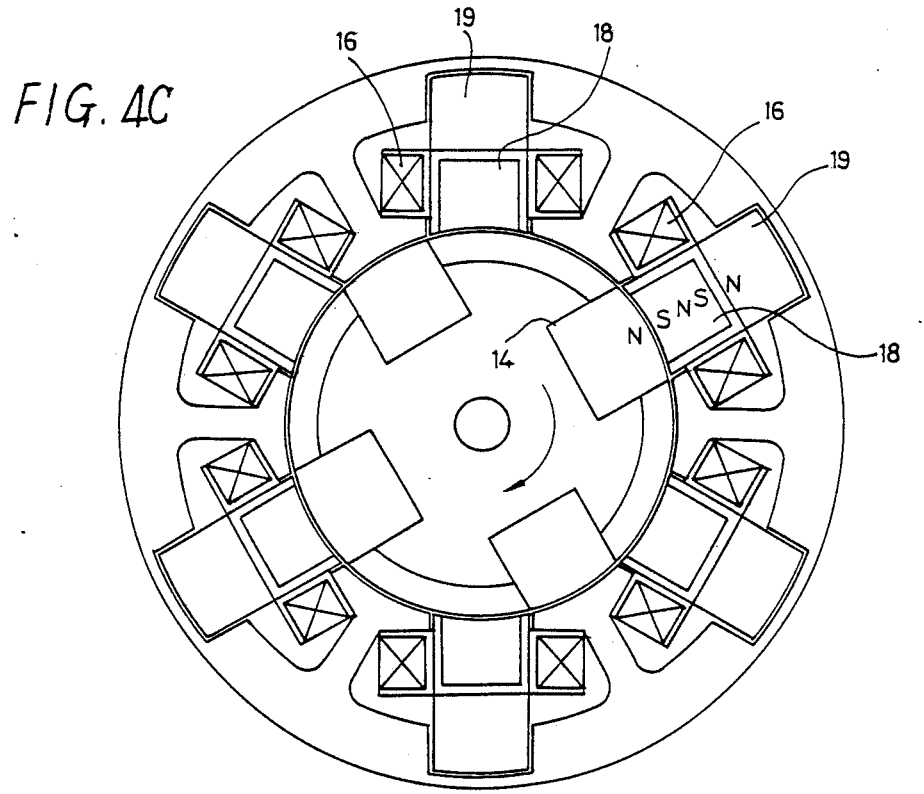

Thus, the permanent magnetic core (18) of the stator field magnetic assembly (20) has the same N pole polarity as the rotor permanent magnet (14) as illustrated in FIG. 4B. Since a strong magnetism is effectively arranged in an N-S manner in the boosting permanent magnet (19), a repulsive force operates between the rotor permanent magnet (14) and the stator permanent magnetic core (18) and the rotor (10) thus begins to rotate (FIG. 4B). The corresponding permanent magnet (14) of the rotor (10) which rotates by means of the repulsive force against the stator permanent magnetic core (18) approaches the unexcited neighboring stator field magnetic assembly (20) and continues to rotate by means of the attracting force which operates between the permanent magnetic core (18) of this neighboring stator field magnetic assembly (20) and the rotor permanent magnet (14). Then, the field coil (16) of this neighboring stator field magnetic assembly (20) is excited and the rotor (10) rotates smoothly by operation of the resultant repulsive force (FIG. 4C).

Thus, according to the present invention, an attracting force is effected with the rotor permanent magnet when the field coil is not excited, and the permanent magnetic core on which the repulsive force operates when the field coil is excited operates on the rotor as a magnetic force, which is boosted to a considerable degree by the boosting permanent magnet, to improve the efficiency of the motor by promoting its torque, while consuming a small amount of electric power.

The present invention as described hereinabove includes four rotor poles and six stator field poles. However, it is possible to construct the present invention with the number of rotor poles being a multiple of 4 and the number of stator field poles being a multiple of 6. Additionally, the construction of the position sensing permanent magnets and/or the position sensing elements is changeable.

I claim:
1. In a brushless DC motor having a rotor assembly and a stator assembly, the rotor assembly including a plurality of rotor permanent magnets of a first polarity equally spaced along an outer circumference thereof, the stator assembly including a plurality of stator magnetic field assemblies equally spaced along an inner circumference thereof and facing the rotor assembly, the improvement comprising a stator magnetic field assembly comprising:
 a box-like magnetic core having an opening facing the rotor assembly and a bottom wall opposite said opening;
 a permanent magnetic core disposed within said box-like magnetic core and having a surface facing the rotor assembly, said permanent magnetic core being of a second polarity at said surface facing the rotor assembly;
 a field coil wound in proximity to said box-like magnetic core for energizing the stator magnetic field assembly; and,
 a boosting permanent magnet having a surface facing an outer surface of said bottom wall of said box-like magnetic core, said boosting permanent magnet being of the first polarity at said surface facing the outer surface of said bottom wall of said box-like magnetic core;
 wherein upon nonexcitation of said field coil, an attracting magnetic force is present between the stator magnetic field assembly and a rotor permanent magnet of the rotor assembly, and
 wherein upon excitation of said field coil, said permanent magnetic core becomes of the first polarity at a said surface facing the rotor assembly, and a repulsive magnetic force is present between the stator magnetic field assembly and a rotor permanent magnet of the rotor assembly.

* * * * *